No. 775,137. PATENTED NOV. 15, 1904.
W. T. GRIFFIN.
APPARATUS FOR TREATING PEAT.
APPLICATION FILED FEB. 25, 1903. RENEWED APR. 19, 1904.
NO MODEL. 4 SHEETS—SHEET 1.

Witnesses:

Inventor:
Walter T. Griffin,
by
Atty.

No. 775,137. PATENTED NOV. 15, 1904.
W. T. GRIFFIN.
APPARATUS FOR TREATING PEAT.
APPLICATION FILED FEB. 25, 1903. RENEWED APR. 19, 1904.
NO MODEL. 4 SHEETS—SHEET 3.

Witnesses:
Inventor:
Walter T. Griffin,
By William F. Hall
Att'y.

No. 775,137. PATENTED NOV. 15, 1904.
W. T. GRIFFIN.
APPARATUS FOR TREATING PEAT.
APPLICATION FILED FEB. 25, 1903. RENEWED APR. 19, 1904.
NO MODEL. 4 SHEETS—SHEET 4.
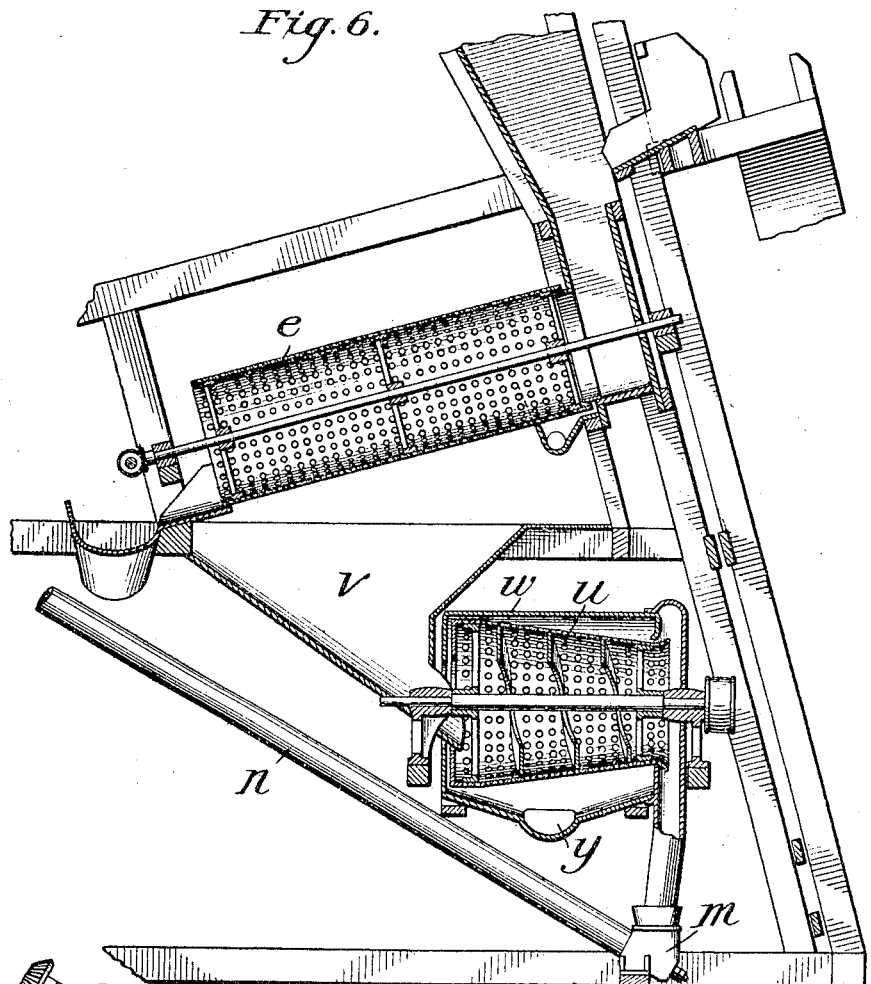
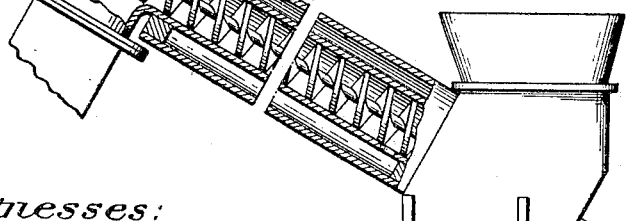
Witnesses:
Inventor:
Walter T. Griffin,
by William F. Hall
Att'y.

No. 775,137.                                        Patented November 15, 1904.

UNITED STATES PATENT OFFICE.

WALTER TIMOTHY GRIFFIN, OF LIMOGES, FRANCE.

APPARATUS FOR TREATING PEAT.

SPECIFICATION forming part of Letters Patent No. 775,137, dated November 15, 1904.

Application filed February 25, 1903. Renewed April 19, 1904. Serial No. 203,948. (No model.)

*To all whom it may concern:*

Be it known that I, WALTER TIMOTHY GRIFFIN, a citizen of the United States, residing at Limoges, France, have invented certain new and useful Improvements in Apparatus for Treating Peat, of which the following is a specification.

My invention relates to an apparatus for the excavation of crude peat, salt, &c., and the subsequent treatment thereof to prepare the same for commercial use.

The object of the invention is to provide a single or unitary apparatus for economically gathering the peat from the bog, conveying the same to a compressing device for forming the material into powder briquets or blocks, and for treating the material in transit otherwise than by compression to extract a large percentage of the moisture therefrom without detracting or diminishing the calorific properties of the material, whereby a highly satisfactory and valuable product is produced.

Other objects of the invention will appear and the many advantages of the same be appreciated when the apparatus is more fully described.

To attain the ends set forth, the invention includes a novel construction of conveyer for carrying the peat to the compressor after the same has been gathered and passed through a screening operation, this conveyer including means for subjecting the material in transit first to the action of heat and immediately to a cooling and separating action.

The invention also includes the details of construction, combination, and arrangement of parts to be hereinafter described, and particularly pointed out in the claims.

While the invention is susceptible of various modifications, I have illustrated in the accompanying drawings and shall hereinafter describe but a single embodiment of the same.

Figure 1:
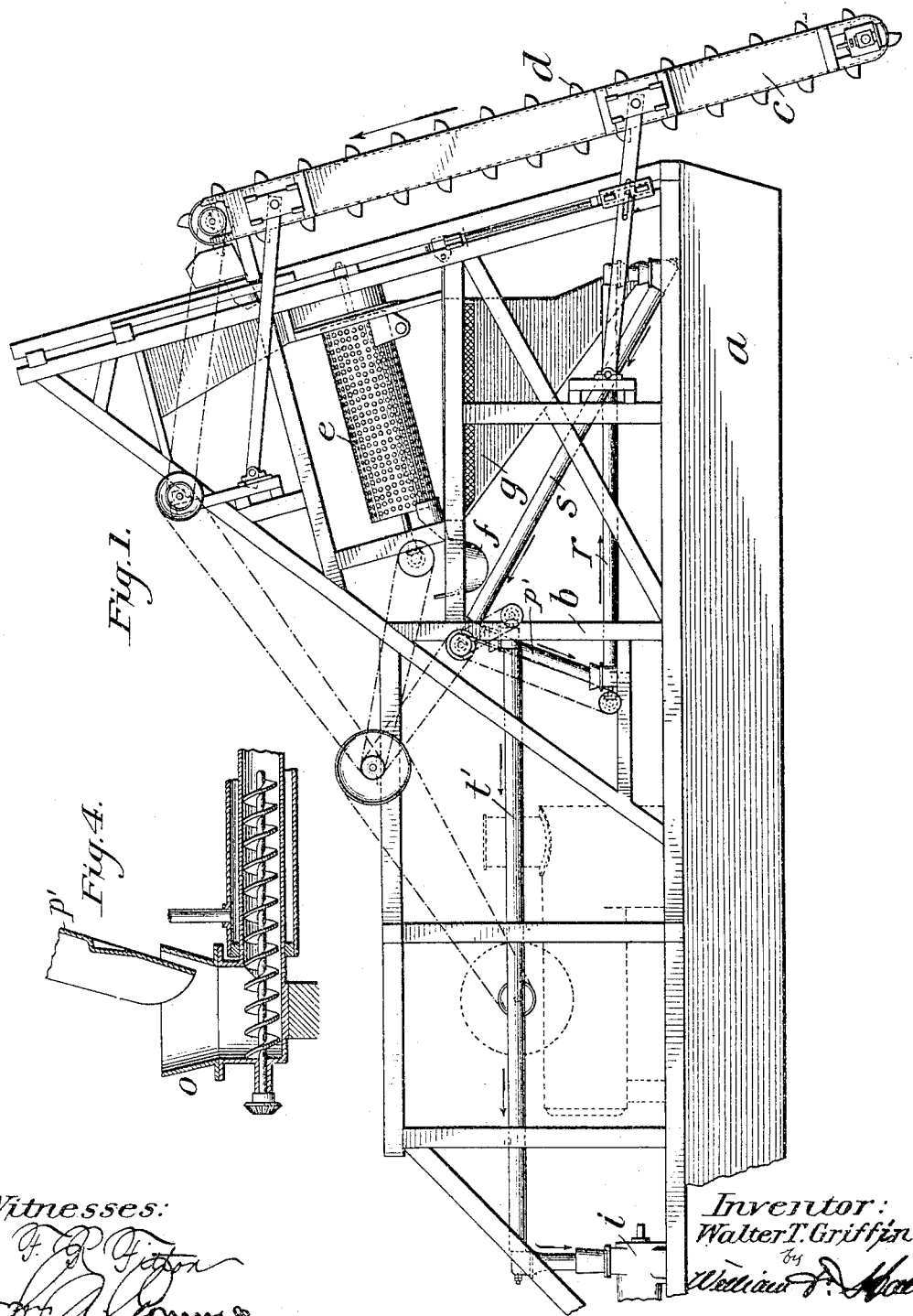
Figure 2:
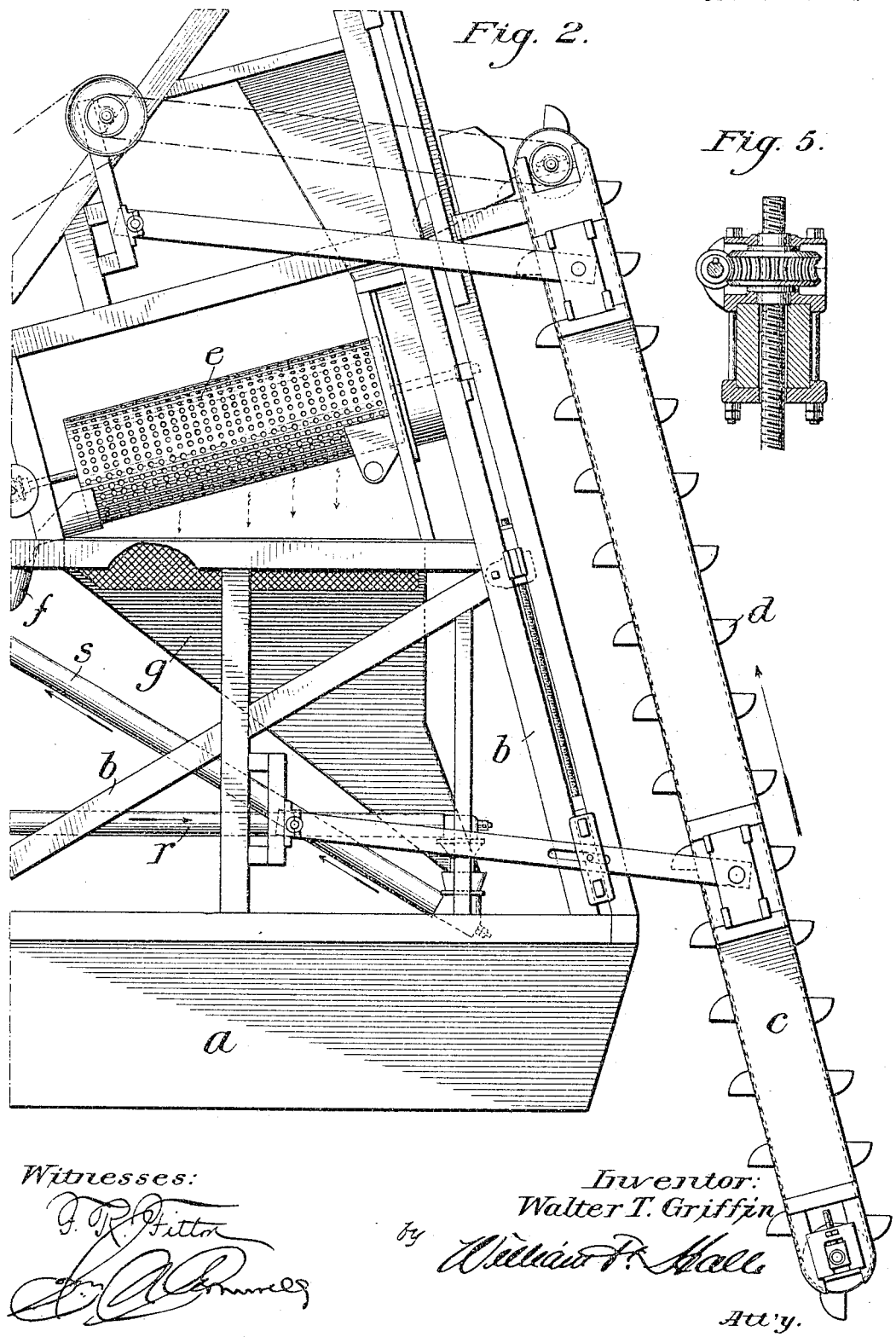
Figure 3:
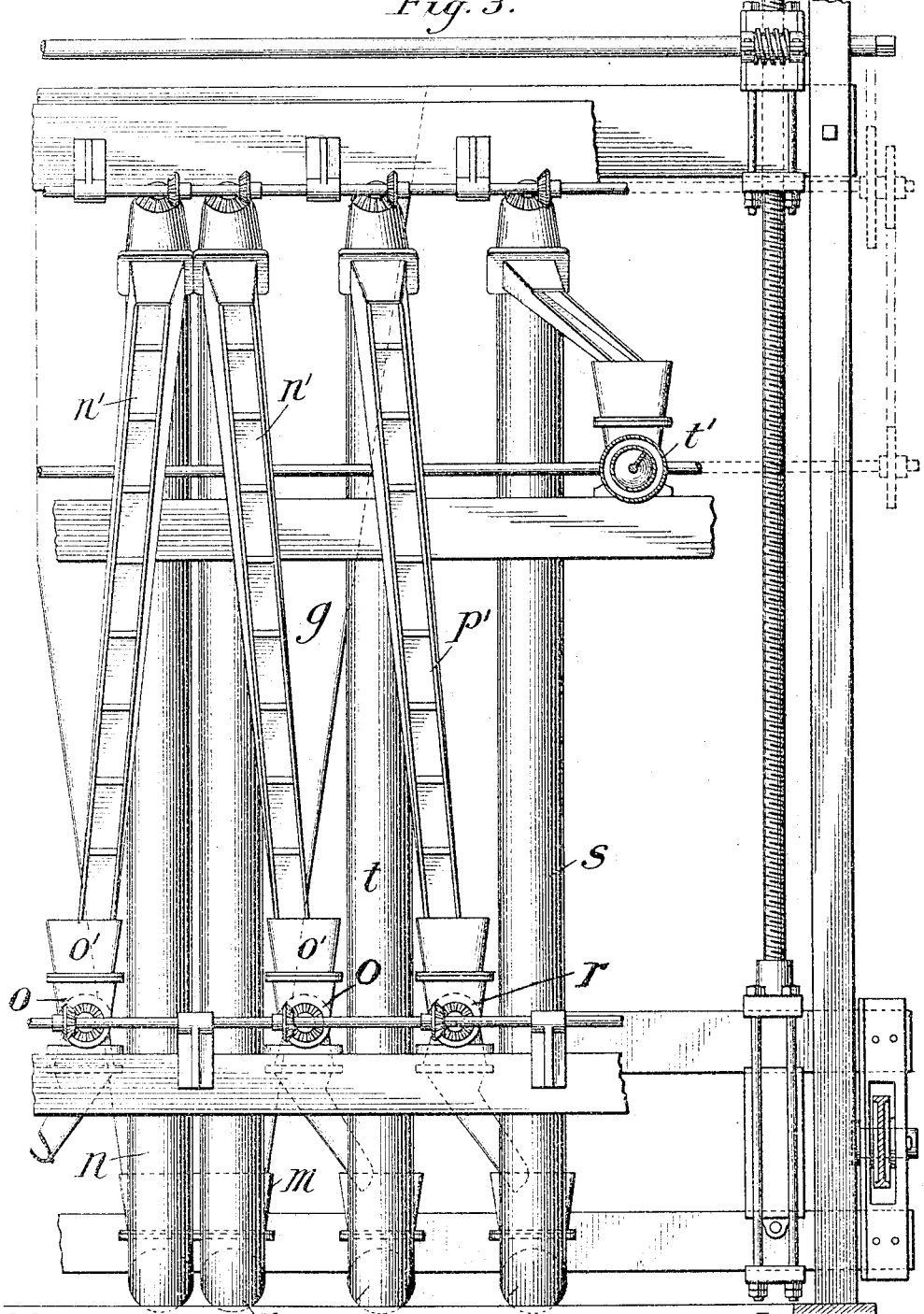

In the drawings, Figure 1 is a side elevation of the apparatus, parts being broken away. Fig. 2 is a detail elevation on an enlarged scale. Fig. 3 is a detail view of a transverse section of the apparatus. Fig. 4 is a detail view of a section of the conveyer. Fig. 5 is a detail sectional view of a part of the drive mechanism. Fig. 6 is a detail view of a modification, and Fig. 7 is a detail longitudinal sectional view of one of the inclined members of the conveyer.

My apparatus includes generally means for excavating the crude peat from the bog in thin layers or cakes, preferably of but a fraction of an inch in thickness, means for elevating the excavated material and dumping the same into a suitable movable screen, where all extraneous matter is separated from the peat, means for separating the free water from the screened material and drawing the same off, a compressor for forming the material into blocks or briquets, and a novel conveyer for carrying the material to the compressor, this conveyer including means for heating the peat and immediately cooling and separating the same, this operation being preferably carried on successively a plurality of times.

As is well known, peat is a fibrous cellular substance, the cells of which containing a large percentage of free water.

It is my purpose to pass the material through heated zones to expand the cells of the peat to the point of bursting in order that the water contained in the same may be released and yet not to permit the material to be heated to such a degree that the valuable oils and gases contained therein will be volatilized.

In order that a strong or powerful heat may be applied to the material and yet the volatilization of the gases and oils arrested or prevented, as before premised, my invention includes means for subjecting the material immediately upon its exit from the heated zone to a much lower temperature and at the same time separating or disintegrating the mass, so that not only will the colder atmosphere rapidly permeate the same and congeal any oils or gases in a partly-volatilized state, but the free water released from the broken cellular structure and the steam generated therefrom will be free to pass off and not held in check, as it otherwise might be by the crust which forms on the material during the passage of the same through the heated zones.

In the transit of the material from the draining-station to the compressor the same is preferably passed through a succession of heating, cooling, and separating operations, so as to extract the moisture and dry the material while maintaining the same in such condition that the water released therefrom and the steam will be free to pass off during the entire treatment of the material to permit of strong heat being applied to the peat in its passage through the heated zones and to arrest or prevent the volatilization of the valuable oils and gases contained therein.

In the illustrated embodiment of my invention shown in the accompanying drawings a movable carrier is designated by the letter $a$, forming a base or support for the entire apparatus. This carrier is shown in the form of a scow or lighter adapted for flotation in the water of the bog; but, as will be understood, two or more scows may be substituted for the same, or a scow and a contiguous vehicle, or, in fact, in some instances a vehicle alone may be employed. The framework of the apparatus is designated by the letter $b$, and supported from the front end thereof and depending over the front of the scow is an adjustable elevator-leg and excavator $c$, provided with an endless series of scoops $d$, designed to cut or excavate the peat from the bog in thin layers or cakes and to carry the same to the screening-station, at which point the material is dumped into a cylindrical screen $e$, rotated in any suitable manner and set at such an inclination that the extraneous material separated from the peat will be discharged through the lower open end of the same into a trough $f$, arranged contiguous to said end, which conveys said material to a point of deposit. The separated portions of the peat fall through the meshes of the screen $e$ into a receiving-hopper $g$, located directly under said screen. This hopper is provided with a foraminous upper portion, a contracted lower portion, and a spout leading from the bottom of the latter to the mouth of the conveyer, which carries the material to the compressor $i$.

As the peat is excavated, elevated, and discharged into the screen a quantity of free water is carried with the same, which passes through the meshes in said screen and falls into the hopper $g$. As the peat is of greater specific gravity than the water, however, the former will gravitate to the contracted portion of the hopper, while the water will be forced to the top of the hopper, where it will pass off through the openings therein.

The material discharged from the hopper $g$ is preferably carried by a circuitous route to the compressor $i$, being alternately heated, cooled, and separated a number of times in transit. To effect this purpose, the conduit before referred to is preferably circuitously arranged or coiled at its end communicating with the hopper $g$, one member of each coil being arranged at an inclination and the other member of the same being horizontally disposed and one of the ends of each coil being entirely open, the continuity of the conduit being preserved by open sluices or troughs preferably having ripples arranged transversely of the same.

The entire closed portion of the conduit is heated by any suitable means, preferably as shown in the accompanying drawings, by steam-jackets in communication through suitable pipes with a boiler, steam from which may be used for the engine which drives the entire apparatus.

It will be apparent that the closed horizontally arranged and inclined members of the conveyers before referred to provide heating zones and that the sluices or troughs arranged between said inclined and horizontal members provide means for cooling and separating the material immediately upon its exit from said zones in its transit from the hopper to the compressing-machine. In the operation of this part of my invention the material which gravitates to the bottom of the hopper $g$ is discharged therefrom into a hopper $m$, which in turn discharges the material into the lower open ends of the inclined members $n\ n$ of the conduit. By means of rotating forwarding-worms arranged axially of the members $n\ n$, which are driven in any suitable manner, the material deposited in the lower ends of the latter is carried upwardly therethrough, is heated in its passage, and is discharged into the open atmosphere through the upper ends of said members. The discharged material falls into the open sluices or troughs $n'\ n'$, passes down through the same, and is discharged at the lower ends thereof into the hopper $o'$, which in turn discharges the material into the open ends of each of the members $o$ of the conduit, the material being both cooled and separated in its passage through said sluices. By means of worms driven in any suitable manner working in the members $o$ the material is carried through the latter, being heated in transit, and is discharged at the rear ends of said members into hoppers communicating with the lower ends of each of the inclined members $t$. By means of worms arranged in the latter the material is carried upwardly through the same and discharged through the upper open ends thereof into each of the sluice-boxes $p'$, corresponding to the troughs $n'\ n'$. The material passes down through the sluice-boxes $p'$, is separated and cooled in transit, and is discharged into the members $r$, corresponding to the members $o$. By means of forwarding-worms the material is carried to the rear of the members $r$, being heated in transit, discharged into the hoppers communicating with the lower ends of the members $s$, elevated through the latter by suitable driving-worms, being heated in transit, and discharged at the upper ends of said members $s$ into hoppers feeding into the open ends of the major members $t'$ of the conduit, which carry the material directly to the compressing-station, where the compressing-machine is located.

As the two ends of the conduit adjacent to the front ends of the same are correspondingly constructed or coiled, in the cross-sectional view, Fig. 3, I have deemed it necessary to show but one end of said conduit complete or but one-half of the entire conduit at this end, as it will be understood that the part omitted is but a duplicate of that illustrated.

Where the peat or other material to be dried carries considerable free water, it may be found desirable to construct my apparatus as shown in Fig. 6, in which a centrifugal separator is interposed between the separating-screen and the drying-conduit. Thus, as shown in Fig. 6, the hopper $g$ is dispensed with and a centrifugal separator interposed between the screen $e$ and the hopper $m$, which discharges into the lower ends of the inclined members $n$ of the drying-conduit. This centrifugal separator consists of a slightly-tapering cylinder $u$, having open ends and perforated walls mounted to rotate in suitable bearings within a fixed surrounding casing $w$. The water caught by the casing may flow outward through an opening $y$ or trough leading from said casing. The material falling from the screen $e$ is caught by the directing-spout $v$, which discharges the same into the larger end of the cylinder $u$, where it is fed forward through said cylinder by a spiral screw or web 24 and discharged through a chute or pipe arranged contiguous to the smaller end of the cylinder into the hopper $m$.

From the foregoing the construction and operation of my apparatus will be understood, and it will be appreciated that the parts and combination of parts may be changed and varied within a wide range without departing from the spirit of the invention.

Having thus described my invention, what is claimed as new, and desired to be secured by Letters Patent, is—

1. In an apparatus for the treatment of peat, salt, &c., a conduit including a series of heating-sections arranged in pairs, and a section having separating means leading from the exit end of one of the heating-sections of each pair to the inlet end of the other heating-section of the pair, substantially as described.

2. In an apparatus for the treatment of peat, salt, &c., and in combination, a conduit including a series of regularly-arranged horizontally and inclined heating-sections, and a series of substantially vertically-arranged cooling-sections extending between the exit end of the inclined section to the inlet end of the succeeding horizontal section of the conduit, substantially as described.

3. In an apparatus for the treatment of peat, salt, &c., a conveying-conduit of coil formation, including a plurality of closed members having open ends and other members formed by troughs interposed between said first members, substantially as described.

4. In an apparatus for the excavation and continuous treatment of peat, salt, &c., and in combination, an excavator and elevator, a screen designed to receive the material discharged therefrom, a receiving-hopper arranged beneath said screen, and a conveyer leading from said hopper designed to carry the material through a circuitous path, said path having a series of heating zones arranged therein, substantially as described.

5. In an apparatus for the treatment of peat, salt, &c., and in combination, means for excavating the peat in thin slices, a movable screen, means for carrying the excavated peat to the latter, a receiving-hopper arranged beneath said screen, and a conduit leading from said hopper including a series of coils vertically arranged, each of said coils including a member formed by an open trough, substantially as described.

6. In an apparatus for the treatment of peat, salt, &c., and in combination, means for excavating the peat in thin slices, a movable screen, means for carrying the excavated peat to the latter, a receiving-hopper arranged beneath said screen, and a conduit leading from said hopper including a plurality of closed compartments, means for heating the latter, and a plurality of open compartments, substantially as described.

7. In an apparatus for the treatment of peat, salt, &c., and in combination, means for excavating the peat in thin slices and elevating the same, a rotating screen, a hopper arranged beneath the latter having a contracted lower portion with a discharge-spout leading therefrom, and a foraminous upper portion, and a conveyer leading from said hopper, substantially as described.

In testimony whereof I have hereunto signed my name, in the presence of two attesting witnesses, at New York, in the county of New York and State of New York, this 29th day of January, 1903.

WALTER TIMOTHY GRIFFIN.

Witnesses:
 O. H. GLENDINNING,
 E. R. HUDDERS.